UNITED STATES PATENT OFFICE.

LOUIS BENDA, OF MAINKUR, NEAR FRANKFORT-ON-THE-MAIN, GERMANY, ASSIGNOR TO LEOPOLD CASSELLA & CO. GESELLSCHAFT MIT BESCHRANKTER HAFTUNG, A CORPORATION OF GERMANY.

COMPOUND OF THE ACRIDINE SERIES AND A PROCESS OF MAKING THE SAME.

1,427,431.   Specification of Letters Patent.   Patented Aug. 29, 1922.

No Drawing.   Application filed July 14, 1921. Serial No. 484,781.

*To all whom it may concern:*

Be it known that I, LOUIS BENDA, a subject of the Swiss Republic, residing at Mainkur, near Frankfort-on-the-Main, Germany, Bismarckstrasse 8, have invented new Compounds of the Acridine Series and a Process of Making the Same (for which I have made application in Germany December 20, 1917; in Czecho-Slovakia July 10, 1920; in Austria July 6, 1920; in Italy July 9, 1920; and in Switzerland July 3, 1920), of which the following is a full description.

By the action, preferably in the presence of dilute mineral acids, of formaldehyde on 3.6-diamino-10-alkylacridinium compounds new substances are obtained which, owing to their extraordinarily strong antiseptic and parasiticidal properties, are of practical importance for the treatment of wounds as well as of certain skin diseases; they are also valuable for cotton-dyeing and printing, in consideration of the good fastness and great tintorial power of their tannin-lakes.

The reaction takes place at normal temperature, the products are sparingly soluble in warm water and warm dilute mineral acids, whilst at ordinary temperature they are nearly insoluble; they are particularly well suited for use as a dusting powder; on mordanted cotton, in an acetic acid bath, they produce orange-yellow shades.

Example 1: 10,4 kilos 3.6-diamino-10-methylacridiniumchloride (D. R. P. 243085) are dissolved in 100 liters water and mixed with 80 liters normal hydrochloric acid. On adding 20 liters formaldehyde (30%) to the deep orange-red solution a bright orange-yellow coloured, thick paste is formed instantaneously. This is stirred for some time, filtered, washed with normal hydrochloric acid and afterwards with some water, pressed and dried.

The product thus obtained represents a brick-red powder, insoluble both in water and dilute hydrochloric acid, when cold; in concentrated sulfuric acid it dissolves with an intense orange-yellow colour, without any fluorescence worth mentioning, in contradistinction to the parent material, the concentrated sulphuric acid solution of which is only of a very pale yellowish colour and showing an extraordinarily strong greenish fluorescence. Mordanted cotton in an acetic acid bath is dyed yellow.

The quantity of formaldehyde may vary within wide limits. When in the above example the 3.6-diamino-10-methylacridiniumchloride is substituted by homologue and analogue acridinium-dyestuffs, compounds of similar properties result.

Mordanted cotton in an acetic acid bath is dyed yellow.

Having now particularly described and set forth the nature of my said invention and in what manner same is to be performed, I declare, that what I claim is:

1. A process for the production of new acridine derivatives by treating 3.6-diamino-10-alkylacridinium compounds with formaldehyde in the presence of dilute mineral acids, at ordinary temperature.

2. As new substances the products obtained from 3.6-diamino-10-alkylacridinium compounds and formaldehyde in the presence of dilute meneral acids at ordinary temperature.

3. As new substance the product obtained from 3.6-diamino-10-methylacridinium and formaldehyde in the presence of dilute hydrochloric acid at ordinary temperature, which is in the dry state a brick-red powder insoluble both in water and dilute hydrochloric acid, when cold; dissolving in concentrated sulphuric acid with an intense orange-yellow colour, without any fluorescence worth mentioning, and dyeing mordanted cotton in an acetic acid bath yellow shades.

In witness whereof I have hereunto signed my name this 16th day of June 1921, in the presence of two subscribing witnesses.

DR. LOUIS BENDA.

Witnesses:
 FRITZ STAAB,
 AUGUST SCHWALB.